No. 783,268. PATENTED FEB. 21, 1905.
H. T. HARRISON.
ELECTRICITY METER.
APPLICATION FILED AUG. 1, 1904.

No. 783,268. PATENTED FEB. 21, 1905.
H. T. HARRISON.
ELECTRICITY METER.
APPLICATION FILED AUG. 1, 1904.

No. 783,268. PATENTED FEB. 21, 1905.
H. T. HARRISON.
ELECTRICITY METER.
APPLICATION FILED AUG. 1, 1904.

Patented February 21, 1905

UNITED STATES PATENT OFFICE.

HAYDN THIES HARRISON, OF WESTMINSTER, ENGLAND, ASSIGNOR TO THE WOODSTOCK SYNDICATE LIMITED, OF LONDON, ENGLAND.

ELECTRICITY-METER.

SPECIFICATION forming part of Letters Patent No. 783,268, dated February 21, 1905.

Application filed August 1, 1904. Serial No. 219,103.

*To all whom it may concern:*

Be it known that I, HAYDN THIES HARRISON, a subject of the King of Great Britain and Ireland, residing at Westminster, England, have invented Improvements in Electricity-Meters, of which the following is a specification.

This invention relates to electricity-meters of the type wherein the current that passes through the meter decomposes an electrolyte contained in a vessel provided with a scale by means of which the quantity of current that has passed through the meter can be ascertained. Meters of this type as hitherto usually constructed are attended by the disadvantages that when a certain quantity of electrolyte has been decomposed the vessel for containing the electrolyte (hereinafter referred to as the "container") has to be refilled with electrolyte and the previous indication is therefore lost.

Now this invention has for objects to register the amount of electrolyte added in substitution for that decomposed and to prevent the register so made from being tampered with. For these purposes the meter is provided with a casing that is closed, with the exception of an inlet for electrolyte, and above the container and within the casing there are provided means for receiving the electrolyte from the inlet for emptying it into the container and for registering the amount so delivered thereto.

In an example of a meter according to this invention the casing of the meter is provided above the container with a chamber that is above, with the exception of an inlet at the top and an outlet in the bottom, and is arranged directly over the container, so that all electrolyte issuing from this chamber will flow into the container. In the chamber there is provided a vessel which is mounted to rock on an axis located below its center of gravity and the interior of which is divided into two compartments by a wall extending upward from its axis, so that if electrolyte be poured through the inlet it will enter the higher of the two compartments until such a quantity will have entered as to overbalance the rocking vessel, whereupon electrolyte will flow from the inlet into the other compartment, while that in the compartment already filled will be emptied upon the floor of the chamber and will run through the outlet thereof into the container. When the other compartment has been filled, the vessel will again be rocked, and so on. The rocking vessel is provided with a pawl by means of which each semi-oscillation of the vessel will operate a ratchet-wheel of a register, which will consequently indicate the amount of electrolyte poured into the meter or the quantity of current corresponding thereto, so that by adding this amount or quantity to that indicated by the scale of the container the total amount of electrolyte decomposed or current consumed can be ascertained. As the whole of the working parts are securely shut in, the register cannot be tampered with.

In order to avoid the necessity of the continual attention required for refilling the container of a meter of the type mentioned provided, as aforesaid, with means for receiving, emptying, and registering the amount of electrolyte added, the meter is in some cases provided with means for supplying electrolyte automatically to the receiver.

In an example there is placed above the chamber containing the rocking vessel of a meter constructed as hereinbefore described an electrolyte-tank in the lower part of which is a valve which is adapted to control the entry of electrolyte through the inlet of the chamber. This valve is connected to the container, which is suspended, so that it can rise and fall, and so open and close the valve. The container may be carried by links connected to arms projecting from a spindle provided with a crank supporting the valve and also with suitable means for balancing the container and the valve. The valve may, however, be connected to a float adapted to be supported by the electrolyte and to open and close the valve, as required.

The invention, which consists in the various features hereinafter set forth in the claims, is illustrated by the accompanying drawings, which represent three examples of meters constructed according to this invention.

Figure 1:
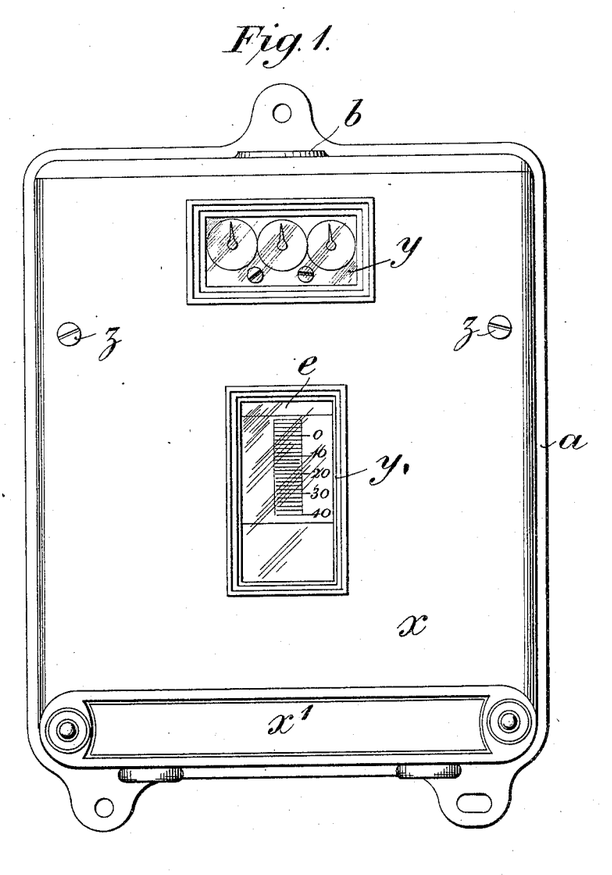
Figures 1, 2, and 3 represent a meter constructed according to this invention, but unprovided with means for automatically supplying electrolyte to the measuring device, Fig. 1 being a front elevation of the meter, Fig. 2 a front view of the meter as it appears after the removal of the front plate or cover of the casing, and Fig. 3 a transverse section of the meter.
Figure 2:
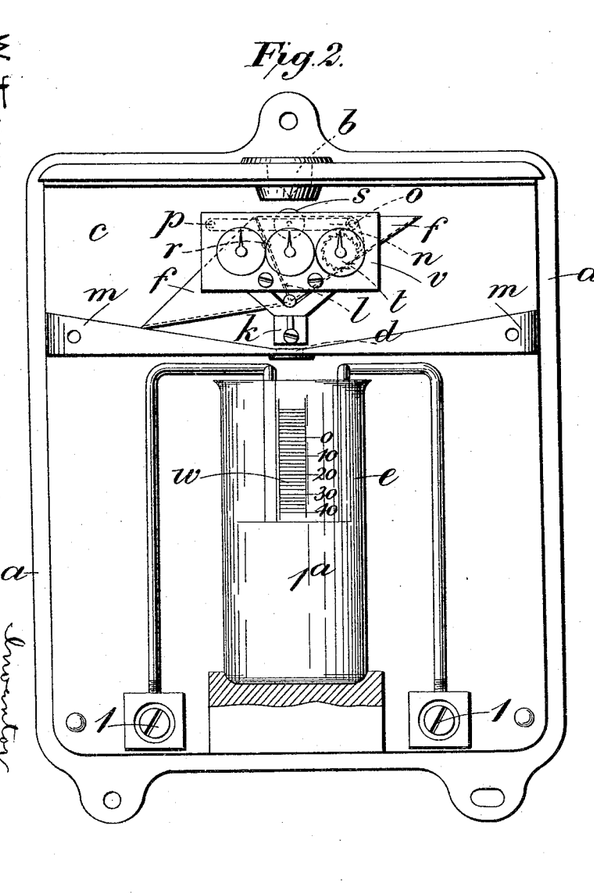
Figure 3:
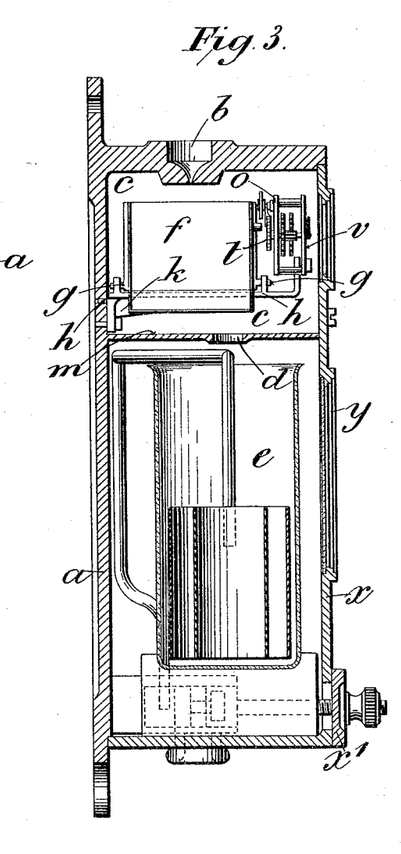

The casing $a$ of the meter shown in Figs. 1, 2, and 3 is closed, with the exception of an inlet $b$, which leads into a chamber $c$, otherwise closed, with the exception of an outlet $d$, arranged over the container $e$.

$f$ is a vessel provided at its lower part with pivots $g$, mounted in bearings $h$ in a bracket $k$, screwed to the rear part of the casing $a$ of the meter, the arrangement of the pivots $g$ being such that the vessel $f$ can be rocked about a horizontal axis located below its center of gravity. The interior of the vessel $f$ is divided into two equal compartments by a wall $l$, extending upward from its axis of oscillation, which is immediately under the inlet $b$ of the chamber $c$, so that electrolyte poured through the inlet $b$ will first charge the compartment of the vessel $f$ for the time being under it until the vessel is overbalanced and rocks about its axis, so as to deliver the contents of the compartment that has just been charged upon the floor $m$ of the chamber $c$, and if electrolyte be still poured in through the inlet $b$ the other compartment of the vessel $f$ will be charged therewith and the vessel $f$ similarly rocked about its axis in the opposite direction and caused to deliver the electrolyte thus supplied to it upon the floor $m$ of the chamber $c$. The electrolyte thus delivered by the receiver $f$ flows through the outlet $d$ into the container $e$.

$n$ is a pawl carried by a lever $o$, which is pivoted at $p$ and which is operated at each semi-oscillation of the vessel $f$ by means of a projection $r$, which is carried by the vessel $f$ and acts upon a roller $s$, which is mounted on the lever $o$. The pawl $n$ is thus caused at each semi-oscillation of the vessel $f$ to operate the ratchet-wheel $t$ of a register $v$, (carried by the bracket $k$,) which will consequently indicate the amount of electrolyte poured into the meter or the quantity of current corresponding thereto. The container $e$ is provided with a scale $w$ in the ordinary way, so that by adding the amount or quantity indicated by the register $v$ to that indicated by the scale $w$ the total amount of electrolyte decomposed or current consumed can be ascertained. The working parts of the meter are shut in by a front plate $x$, which is provided with windows $y$ for inspecting the register and the scale and which can be secured to the body of the casing by means of screws $z$ and fixed by sealing or otherwise, so as to obviate tampering.

$x'$ is a plate secured by studs and thumb-nuts over a slot, Fig. 3, provided in the lower part of the plate $x$ to give access to the binding-screws 1 of the electrodes 2.

Figure 4:
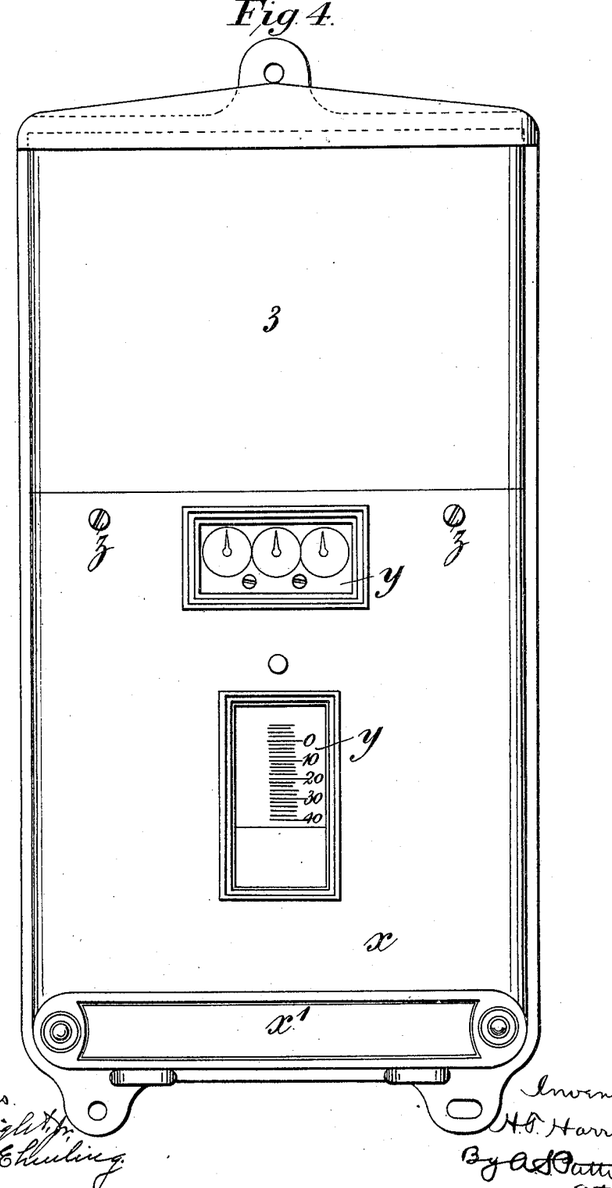
Figs. 4, 5, and 6 are views corresponding, respectively, to Figs. 1, 2, and 3 of a meter provided according to this invention with receiving, emptying, and registering apparatus and also with means for automatically supplying electrolyte to the receiver.
Figure 5:
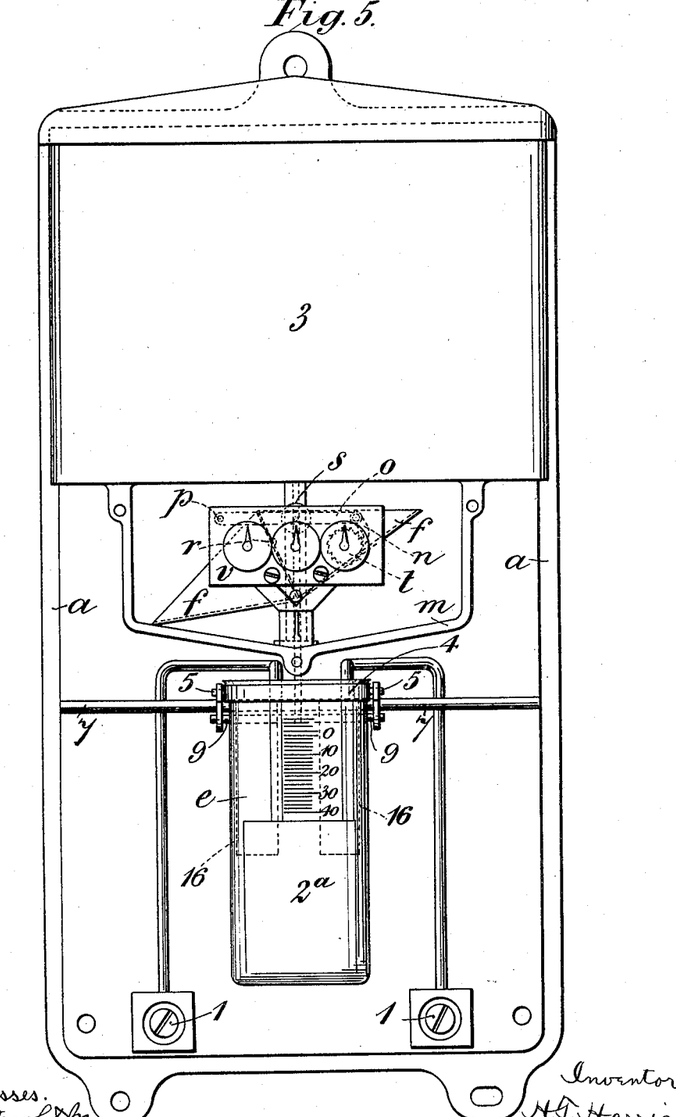
Figure 6:
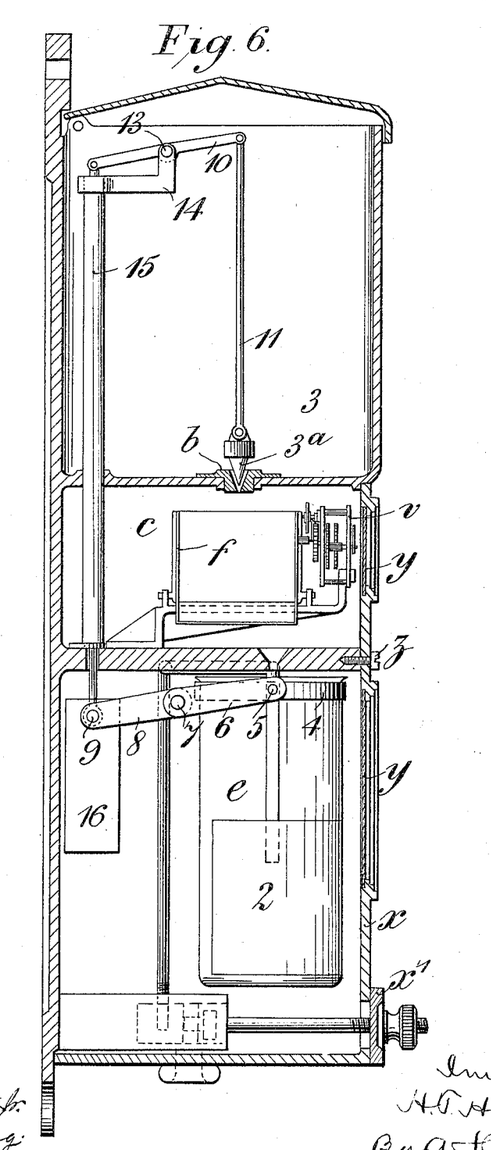

In the meter shown in Figs. 4, 5, and 6, which in addition to the receiving, emptying, and registering apparatus is provided with means for automatically supplying electrolyte to the receiver, an electrolyte-tank 3 is arranged above the chamber $c$, containing the receiver $f$, and in the lower part of the tank is a valve $3^a$, adapted to control the entry of electrolyte from the tank 3 through the inlet $b$ of the chamber $c$. The container $e$ is suspended in a ring 4 and supported by pivots 5, resting in slots in arms 6, projecting from a spindle 7, to which are fixed two arms 8, connected together by a rod 9, which supports the valve $3^a$ by means of a lever 10, of which one end carries the valve $3^a$ by a rod 11, and the other end is connected to the rod 9 by a link 12. The lever 10 is pivoted at 13 in a bracket 14, extending from a tube 15, which extends up from the floor of the chamber $c$ and through that of the tank 3 to above the highest level at which it is intended that the electrolyte should be in the tank 3. To balance the container $e$ and the valve $3^a$, weights 16 are mounted on the rod 9.

Figure 7:
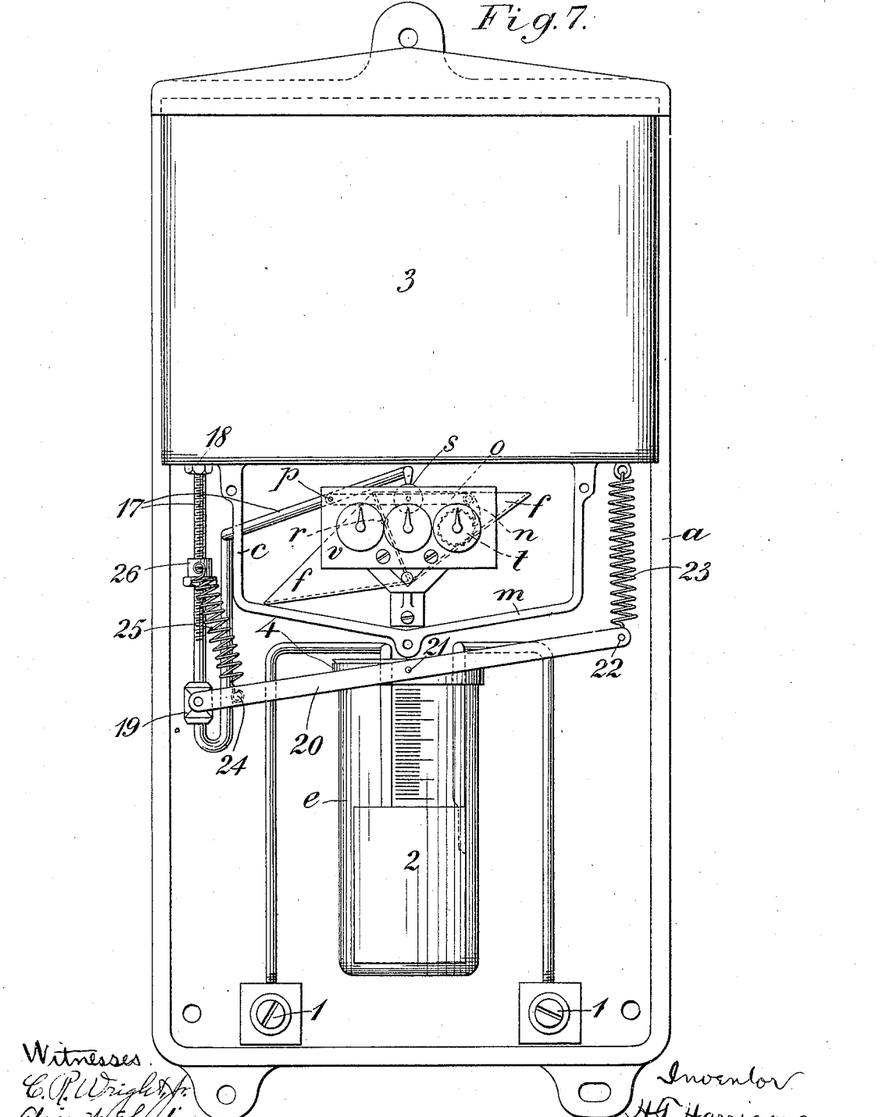
Figs. 7 and 8 are views corresponding, respectively, to Figs. 5 and 6 of a modification of the meter shown in Figs. 4, 5, and 6.
Figure 8:
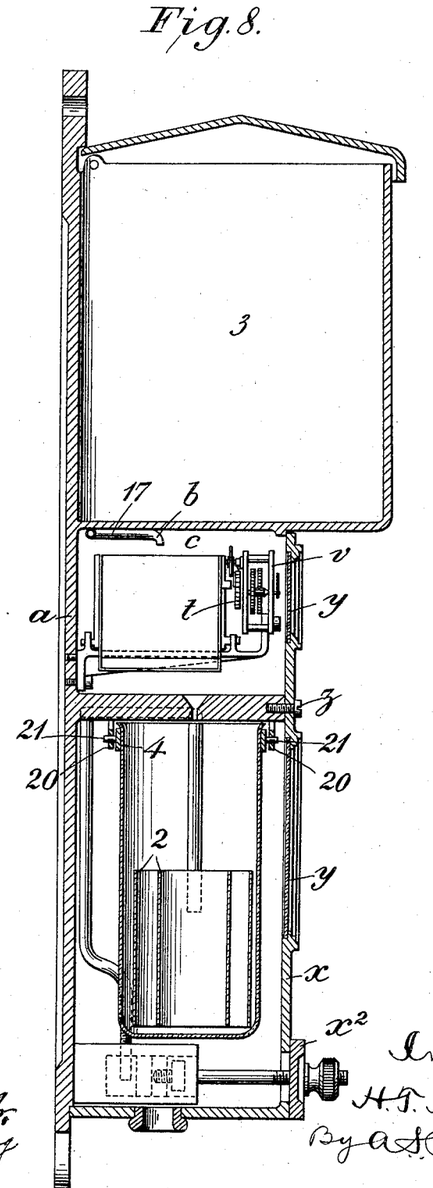

In the meter of modified construction shown in Figs. 7 and 8 the electrolyte-inlet $b$ of the chamber $c$ is instead of being formed in the floor of the tank 3 formed by one end of a pipe 17, which is connected at its other end to the tank 3 at 18. From 18 the pipe 17 extends downward to a position about level with the normal position of the ring 4 and is there provided with a cock 19, to the plug of which are secured two levers 20, in which the ring 4 is pivoted at 21. The levers 20 are connected together at their outer ends by a rod 22, which is attached to the lower end of a spring 23, the upper end of which is attached to the tank 3, while the levers 20 are connected together intermediately by a rod 24, to which is attached the lower end of a spring 25, the upper end of which is attached to a nut 26, fitting on a screw-threaded portion of the pipe 17. The weight of the container $e$ is in this case balanced by the springs 23 and 25, and the force of the spring 25 can be adjusted as required by means of the nut 26.

The operation of ascertaining the total consumption above described is based on the assumption that the container is filled before being put into the meter and is full when the register indicates zero; but it is clear that the container may be initially filled by the measuring device and that the total consumption can still be ascertained in the same way if the register be arranged to indicate zero when by means of the measuring device connected to it the container has been once filled. Obviously if the register be not arranged in the way just stated the container may still be filled by means of the measuring device; but the amount indicated by the register must then be noted and be subtracted from the sum of the indications of the register and the container-scale at the next reading of the meter.

Various changes in construction may be made without departing from the essential features of the invention. In the portion of the invention illustrated by Figs. 4 to 8, inclusive, the valve or cock might be connected to a float adapted to be supported by the electrolyte and to open and close the valve or cock, as required.

What I claim is—

1. An electrolytic electricity-meter comprising a liquid-electrolyte container, and measuring and recording means adapted to be actuated by liquid electrolyte supplied to said container.

2. An electrolytic electricity-meter comprising a container, measuring and recording means adapted to be actuated by electrolyte supplied to said container, and a casing adapted to provide against the supply of electrolyte to said container without actuating said measuring and recording means.

3. An electrolytic electricity-meter comprising a container, measuring and recording means adapted to be actuated by electrolyte supplied to said container, and a casing adapted to provide against the supply of electrolyte to said container without actuating said measuring and recording means and against tampering with the record thus automatically made.

4. An electrolytic electricity-meter comprising a container, a measuring device, a register adapted to be operated by said measuring device, and a casing adapted to provide against the supply of electrolyte to said container otherwise than by means of said measuring device.

5. An electrolytic electricity-meter comprising a container, a measuring device, a register adapted to be operated by said measuring device, a casing adapted to provide against the supply of electrolyte to said container otherwise than by means of said measuring device, and means for causing the whole of the electrolyte delivered by said measuring device to be supplied to said container.

6. An electrolytic electricity-meter comprising a container, a measuring device mounted to turn about an axis and consisting of compartments adapted to receive and deliver in succession electrolyte supplied thereto, a register adapted to be operated by said measuring device, and a casing adapted to provide against the supply of electrolyte to said container otherwise than by means of said measuring device.

7. An electrolytic electricity-meter comprising a container, a measuring device mounted to rock about a horizontal axis below its center of gravity and formed of two compartments adapted to receive and deliver alternately electrolyte supplied to said device, a register adapted to be operated by said measuring device, and a casing adapted to provide against the supply of electrolyte to said container otherwise than by means of said measuring device.

8. An electrolytic electricity-meter comprising a container, a measuring device, a register adapted to be operated by said measuring device, and a casing forming above said container a chamber containing said measuring device and having an inlet adapted to deliver electrolyte into said measuring device and an outlet adapted to supply to said container the electrolyte delivered by said measuring device, said casing being thus adapted to provide against the supply of electrolyte to said container otherwise than by means of said measuring device.

9. An electrolytic electricity-meter comprising a container, measuring and recording means adapted to be actuated by electrolyte supplied to said container, and means for supplying electrolyte to said measuring and recording means as the quantity of electrolyte in said container becomes reduced by decomposition.

10. An electrolytic electricity-meter comprising a container, measuring and recording means adapted to be actuated by electrolyte supplied to said container, means for supplying electrolyte to said measuring and recording means as the quantity of electrolyte in said container becomes reduced by decomposition, and a casing adapted to provide against the supply of electrolyte to said container without actuating said measuring and recording means.

11. An electrolytic electricity-meter comprising a container, measuring and recording means adapted to be actuated by electrolyte supplied to said container, an electrolyte-storage tank adapted to deliver into said measuring and recording means, a valve adapted to control the flow of electrolyte from said tank, and means for operating said valve so as to cause electrolyte to be delivered from said tank into said measuring and recording means in accordance with the decomposition of electrolyte in said container.

12. An electrolytic electricity-meter comprising a container, measuring and recording means adapted to be actuated by electrolyte supplied to said container, an electrolyte-storage tank adapted to deliver into said measuring and recording means, a valve adapted to control the flow of electrolyte from said tank, means for balancing the weight of said container and electrolyte contained therein, and means for connecting said container with said valve so as to cause said valve to be opened by said balancing means on the reduction of the weight of electrolyte in said container.

13. An electrolytic electricity-meter comprising a container, measuring and recording means adapted to be actuated by the electrolyte supplied to said container, an electrolyte-storage tank adapted to deliver into said measuring and recording means, a valve adapted to control the flow of electrolyte from said tank, a lever on which said container is mounted and which is connected to said valve so as to operate said valve on the rise and fall of said container, and means for balancing the weight of said container, electrolyte contained therein, and parts connected thereto so as to cause said valve to be opened on the reduction of the weight of electrolyte in said container.

14. An electrolytic electricity-meter comprising a container, measuring and recording means adapted to be actuated by the electrolyte supplied to said container, an electrolyte-storage tank, a pipe extending downwardly from said tank and then upwardly and into a position in which it is adapted to deliver into said measuring and recording means, a valve in the lower portion of said pipe, and means for operating said valve so as to cause electrolyte to be delivered from said tank into said measuring and recording means in accordance with the decomposition of electrolyte in said container.

15. An electrolytic electricity-meter comprising a container, measuring and recording means adapted to be actuated by the electrolyte supplied to said container, an electrolyte-storage tank, a pipe extending downwardly from said tank and then upwardly and into a position in which it is adapted to deliver into said measuring and recording means, a valve in the lower portion of said pipe, a lever secured to said valve and carrying said container, and means for balancing the weight of said container, electrolyte contained therein, and parts connected thereto so as to cause said valve to be opened on the reduction of the weight of electrolyte in said container.

16. An electrolytic electricity-meter comprising a container, measuring and recording means adapted to be actuated by electrolyte supplied to said container, a source of electrolyte adapted to deliver into said measuring and recording means, a valve adapted to control the flow of electrolyte from said source, and means for operating said valve so as to cause electrolyte to be delivered from said source in accordance with the decomposition of electrolyte in said container.

17. An electrolytic electricity-meter comprising a container, measuring and recording means adapted to be actuated by electrolyte supplied to said container, a source of electrolyte adapted to deliver into said measuring and recording means, a valve adapted to control the flow of electrolyte from said source, means for balancing the weight of said container and electrolyte contained therein, and means for connecting said container with said valve so as to cause said valve to be opened by said balancing means on the reduction of the weight of electrolyte in said container.

18. An electrolytic electricity-meter comprising a container, measuring and recording means adapted to be actuated by the electrolyte supplied to said container, a source of electrolyte adapted to deliver into said measuring and recording means, a valve adapted to control the flow of electrolyte from said source, a lever on which said container is mounted and which is connected to said valve so as to operate said valve on the rise and fall of said container, electrolyte contained therein, and parts connected thereto so as to cause said valve to be opened on the reduction of the weight of electrolyte in said container.

Signed at London, England, this 22d day of July, 1904.

HAYDN THIES HARRISON.

Witnesses:
  PERCY PHILLIPS,
  J. F. D. M. MESTH.